US008359408B2

(12) United States Patent
Ganga et al.

(10) Patent No.: US 8,359,408 B2
(45) Date of Patent: Jan. 22, 2013

(54) ENABLING FUNCTIONAL DEPENDENCY IN A MULTI-FUNCTION DEVICE

(75) Inventors: Ilango S. Ganga, Cupertino, CA (US); Manoj K. Wadekar, San Jose, CA (US); Eric J. DeHaemer, Shrewsbury, MA (US)

(73) Assignee: Intel Corporation, Santa Clara, CA (US)

(*) Notice: Subject to any disclaimer, the term of this patent is extended or adjusted under 35 U.S.C. 154(b) by 950 days.

(21) Appl. No.: 12/215,995

(22) Filed: Jun. 30, 2008

(65) Prior Publication Data
US 2010/0005234 A1 Jan. 7, 2010

(51) Int. Cl.
*G06F 3/00* (2006.01)

(52) U.S. Cl. ............ 710/10; 710/1; 710/3; 710/33; 711/2; 711/111; 711/117

(58) Field of Classification Search .......... 710/1, 3, 710/10, 33; 711/2, 111, 117
See application file for complete search history.

(56) References Cited

U.S. PATENT DOCUMENTS

| | | | | |
|---|---|---|---|---|
| 5,970,496 A | * | 10/1999 | Katzenberger | 1/1 |
| 6,751,622 B1 | * | 6/2004 | Puri et al. | 1/1 |
| 2006/0069868 A1 | * | 3/2006 | Nonaka et al. | 711/114 |
| 2007/0226386 A1 | | 9/2007 | Sharp | |
| 2008/0147898 A1 | | 6/2008 | Freimuth | |
| 2009/0319958 A1 | * | 12/2009 | Li et al. | 715/866 |

FOREIGN PATENT DOCUMENTS

| | | |
|---|---|---|
| CA | 1227931 A | 9/1999 |
| CN | 1648842 A | 8/2005 |
| JP | 11-275169 | 8/1999 |

OTHER PUBLICATIONS

Japanese Patent Office, Office Action mailed Jun. 13, 2011 in Japanese application No. P2009-153206.
Chinese Patent and Trademark Office, Office Action mailed Sep. 21, 2011 in Chinese application No. 200910159439.8.
German Patent and Trademark Office, Office Action mailed Nov. 28, 2011 in German application No. 10 2009 031 126.2.
State Intellectual Property Office, P.R. China, Office Action mailed May 24, 2012 in Chinese application No. 200910159439.8.

* cited by examiner

*Primary Examiner* — Chun-Kuan Lee
*Assistant Examiner* — Jasjit Vidwan
(74) *Attorney, Agent, or Firm* — Trop, Pruner & Hu, P.C.

(57) ABSTRACT

In one embodiment, the present invention includes a method for reading configuration information from a multi-function device (MFD), building a dependency tree of a functional dependency of functions performed by the MFD based on the configuration information, which indicates that the MFD is capable of performing at least one function dependent upon another function, and loading software associated with the functions in order based at least in part on the indicated functional dependency. Other embodiments are described and claimed.

18 Claims, 8 Drawing Sheets

| 31 | 24 | 23 | 20 | 19 | 16 | 15 | 8 | 7 | 0 | Byte Offset |
|---|---|---|---|---|---|---|---|---|---|---|
| Next Capability Offset 175 | | | | Capability Version 170 | | Extended Capability ID 165 | | | | 00h |
| Reserved | | | | | | | | Number of Subordinate Functions 205 | | 04h |
| Subordinate Function 210a | | | | Subordinate Function | | Subordinate Function | | Subordinate Function | | 08h |
| Subordinate Function | | | | Subordinate Function | | Subordinate Function | | Subordinate Function | | ... |
| | | | | | | | | Subordinate Function 210x | | Nh |

ENABLING FUNCTIONAL DEPENDENCY IN A MULTI-FUNCTION DEVICE

BACKGROUND

In a conventional data center network infrastructure, there are multiple networks such as an Ethernet network for local area network (LAN) traffic, Fibre Channel (FC) network for storage traffic, and Infiniband network for inter-process communication (IPC) traffic. Fabric virtualization is a concept in which these multiple networks (e.g., LAN, storage area network (SAN) and IPC) with different characteristics are converged into a single network (e.g., a converged Ethernet). The converged network is divided into logical partitions and each partition retains the original characteristics of its native network. The physical link connecting to the converged fabric is partitioned into logical links (a.k.a. virtual links) and the virtual links are used to connect to the logical networks in a converged fabric.

In a conventional host computer system (or server), separate host controllers (or adapters) are used to connect to each network that is present. For example, a system may include an Ethernet network interface controller (NIC) for LAN traffic, FC host bus adapter (HBA) for storage traffic, and Infiniband host channel adapter (HCA) for IPC traffic.

In certain interconnect systems such as a Peripheral Component Interconnect (PCI) or PCI Express (PCIe) system in accordance with a given PCI specification, support is provided for a multi-function device (MFD) such as a controller that can perform multiple functions. However, these multiple functions are entirely independent from each other such that each appears to the system (and more particularly to an operating system (OS) or other structure) as separate devices.

DETAILED DESCRIPTION

A converged controller in accordance with one embodiment of the present invention is a multi-function device (MFD) such as a PCI or PCIe device (generally PCI, as used herein) with multiple functions such as LAN, SAN, IPC, or security in a single device. In a converged controller, LAN, SAN and IPC functions can be integrated in a single device (or controller). That is, a single card or integrated circuit can include support for these various functionalities. The converged multi-function controller can be used to connect to a conventional fabric or a converged fabric. In this way, the need for separate controllers for individual functions can be eliminated.

One embodiment of a PCI MFD controller is a converged LAN/SAN controller in which both NIC and HBA functions are integrated in the same device. The NIC is identified as a separate function on the PCI interface and the HBA is identified as a separate function. Traffic from both the LAN function and SAN function is converged onto a single Ethernet network link in some embodiments. This Ethernet network link carries the traffic of both LAN and SAN due to fabric convergence (a.k.a. fabric virtualization).

In many situations, however, one or more of the PCI functions of the MFD are dependent on other functions for operation. Such dependency can complicate configuration and prevent proper utilization, as typically the individual functions are defined independently of each other. That is, current specifications independently define devices for such different functionality even in the case of a PCI specification that provides support for a MFD controller, i.e., in current MFDs, the multiple functions in a device are independent of one another. As described above, known controllers provide independent support for each function, and which are typically associated with separate links of the system, e.g., as connected to a universal serial bus (USB) port and an Ethernet port. Thus current specifications do not support multiple functions that can be dependent on one another.

Figure 1:
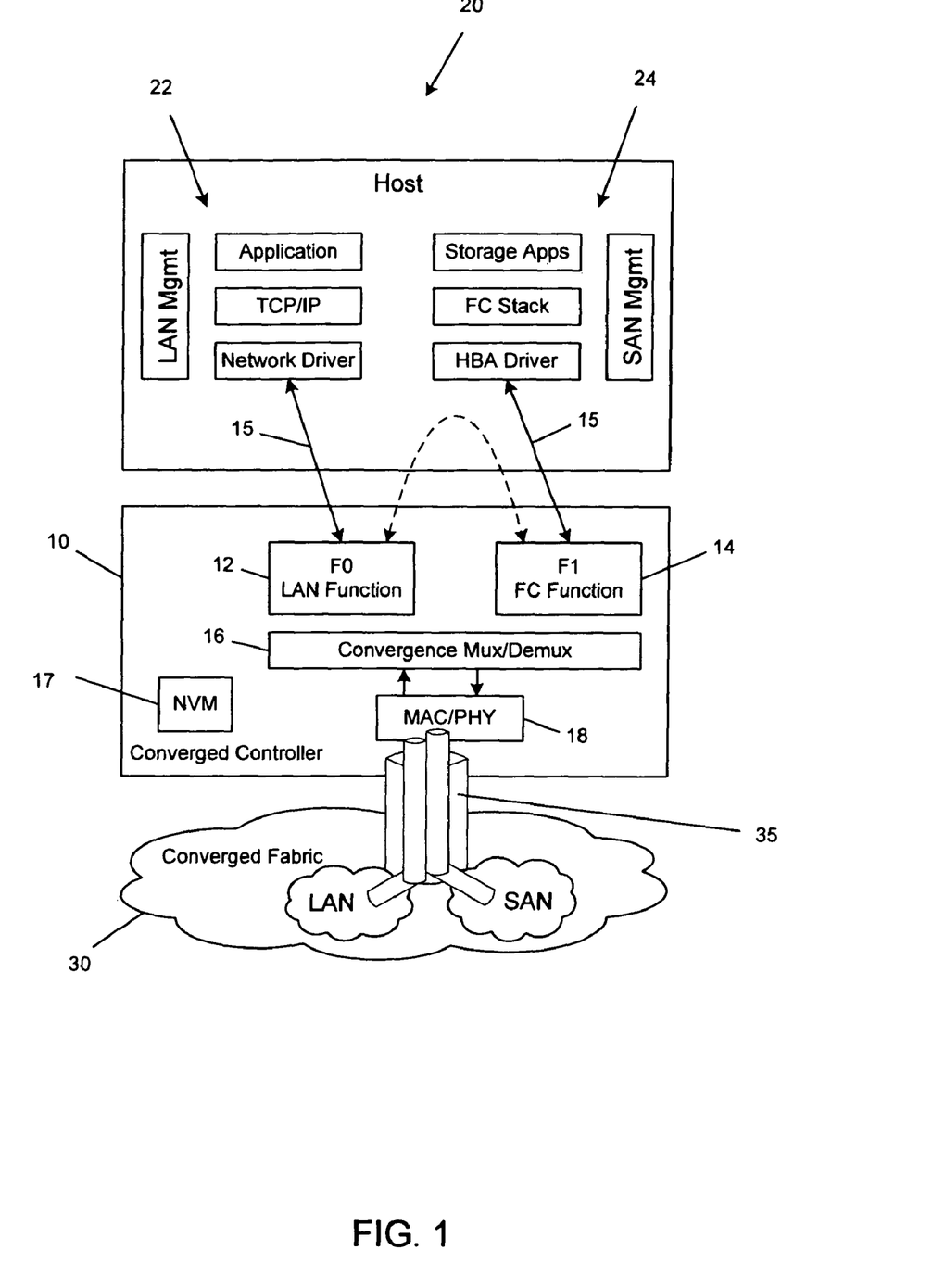
FIG. 1 is a block diagram of a system including a converged multifunction device in accordance with an embodiment of the present invention.

Referring now to FIG. 1, shown is a block diagram of a system including a converged network controller in accordance with one embodiment of the present invention. In this example, converged controller 10, which is coupled to a host system 20, which may be a personal computer (PC), server or other such system, integrates both LAN (NIC) and SAN (FC-HBA) functions and connects to a converged Ethernet network via a fabric 30. While shown as separate components in the embodiment of FIG. 1, understand this is for ease of illustration and in various implementations, converged controller 10 may be within host system 20.

Additional functions such as remote direct memory access (RDMA) function, for IPC traffic, or internet small computer system interface (iSCSI) function for storage traffic can also be implemented in the same controller (although not shown in FIG. 1). As further shown in FIG. 1, system 20 couples to converged fabric 30 via a converged link 35, which provides in a single physical link support for fabric virtualization such that both LAN communications and SAN communications may travel over converged link 35 between converged controller 10 and converged fabric 30. In one embodiment, a converged link 35 may include a plurality of virtual channels, each to handle traffic of a different type.

In one embodiment, converged controller 10 is implemented as a multi-function PCI device (MFD) that includes hardware to support various functions. As shown, hardware is present for a storage function having a separate PCI function (F1) 14 on a host bus 15, and which is detected as a Fibre Channel device and for a LAN function (F0) 12 having a separate PCI function detected as an Ethernet NIC on host bus 15. Since the storage is carried over the Ethernet network it uses a storage over Ethernet protocol such as Fibre Channel over Ethernet (FCoE), in one embodiment. Of course another storage over Ethernet protocol such as iSCSI can also be implemented in a similar manner.

As further shown in FIG. 1, converged controller 10 includes, in addition to hardware for functions 12 and 14, additional hardware. Not that individual functions F0 and F1 may also include hardware to perform certain offload functions to accelerate certain software operations in the host OS. In some embodiments these may be additional hardware for individual functions. Note also there are common functionality on which both the functions are dependent for proper operations. In the embodiment of FIG. 1, where converged controller 10 is a non-offload controller, the additional hardware includes a converged multiplexer/demultiplexer 16, and hardware for media access control (MAC) and physical layer (PHY), i.e., MAC/PHY 18. Note that while shown with multiplexer/demultiplexer 16, in other embodiments other means such as a switch or bridge may be present to control the flow of information to and from MAC/PHY 18 and functions 12 and 14. As further shown in FIG. 1, a non-volatile memory (NVM) 17 may be present. In some implementations, memory 17 may be a minimal portion of storage to store configuration and other such information that can then be provided from converged controller 10 to an OS or other system software to thus provide information regarding its capabilities to the system to enable configuration of the controller in a given system. As will be described further below, this information may include functional dependency information to enable control in accordance with an embodiment of the present invention.

While shown in the implementation of FIG. 1 as a non-offload controller, other embodiments may be implemented in an offload-type controller. In such a controller, in addition to the hardware shown in FIG. 1, other hardware such as a dedicated processor, e.g., a microprocessor, microcontroller or other such programmable processor may be present, in addition to another storage medium, such as a non-volatile memory, e.g., a flash or other such non-volatile memory that can hold programs and other data storage.

As further shown in FIG. 1, host 20 includes various software functionality to enable operation of functions 12 and 14. Specifically, as shown in FIG. 1, for LAN-type communications, LAN software 22 may be present that may include applications, LAN management software, a transmission control protocol/internet protocol (TCP/IP) stack, and a network driver. Such software may be loaded from an OS (not shown in FIG. 1) of host 20 to enable communications via function 12 through converged controller 10. Similarly, to enable SAN operations using function 14 of converged controller 10, host system 20 may further include SAN software 24, including, for example, storage applications, a Fibre Channel stack, a HBA driver, along with SAN management software. While shown with this particular implementation in the embodiment of FIG. 1, the scope of the present invention is not limited in this regard.

Since converged controller 10 is detected as separate NIC and HBA devices on host bus 15, these devices are integrated to the respective network and storage software stacks in the OS. The operating system thus loads the corresponding NIC function driver and Fibre Channel function driver within host system 20, and binds to the respective protocol stacks and respective LAN and SAN software 22 and 24.

As an example of the dependency between functions, since the storage (e.g., FC) function runs over the Ethernet FCoE protocol, link 35 should be operational before the storage function is made operational, as represented by the dashed line in FIG. 1. Thus the common functions such as performed by hardware of converged controller 10, including PHY/MAC 18 and convergence multiplexer/de-multiplexer 16, or other such switch, should be initialized and be operational before the FCoE function is enabled. Moreover, the Ethernet virtual link configuration should be completed to properly connect to converged Ethernet network 30.

In this implementation all the common functions (e.g., Ethernet MAC and PHY), are associated with the NIC function (F0). This function is referred to as the primary function, as one or more other functions are dependent on this function. Once the virtual link configuration is completed and logical links for LAN and Fibre Channel are established, the FC function (F1) can be associated with the corresponding virtual link for storage. This function is referred to as a subordinate function, as this subordinate function (F1) is dependent on the primary function (F0) for its operation. In other words, for a storage operation to be performed, the LAN function must first be configured and enabled. In the example illustrated in FIG. 1, the FCoE function is dependent on the LAN function for its operation.

As described above however, current PCI specifications for a multi-function device define individual PCI functions to be independent of one another in a MFD. Hence the OS also treats the PCI functions independently and can load and/or unload the device drivers in any order and perform certain operations on individual functions in any order, and as such the devices can be initialized and be made operational in any order, which may prevent proper operation of a converged controller. Thus certain operations on the primary function may impact the operation of the other function.

Thus in various embodiments of a converged controller the primary function may be made operational before the subordinate functions are made operational. Hence the operating system or other such software should detect this dependency and first load the primary function driver (and configure the primary function for operation) before loading any subordinate functions. Similarly, the primary function should not be unloaded until all subordinate functions are unloaded. Or in other words, the primary function should be loaded first and unloaded last. In addition, certain operations on a primary function (for example reset) will affect the proper operation of other subordinate functions. So once this dependency is known, the functional dependency control may ensure operations without affecting proper operation of subordinate functions. Such operations may be referred to as driver sequencing or more generally, functional dependency control.

In various embodiments, the multi-function device may have a mechanism to indicate functional dependency in hardware. Based on this indication, the operating system, while performing a scan on the host bus, such as a PCI device scan, should be able to read the respective functionalities and understand the function dependency to determine the order for sequencing loading/unloading of drivers and possibly other software.

To that end, in various embodiments a capability structure can be defined that indicates that a MFD or other such controller has dependent functions, such that driver sequencing or other functional dependency control should be implemented. A PCIe or other base capability can be defined with a data structure such as will be illustrated in FIG. 3 below to specify primary and subordinate functions. Embodiments of a converged controller can have more than one primary function (for example a multi-port converged Ethernet controller can have more than one primary function). Note that each primary function can have one or more subordinate functions. For example, a converged controller which integrates NIC, FC-HBA, iSCSI-HBA and RDMA functions will have more than one subordinate function.

In some cases, devices can have cascaded dependency, meaning that a subordinate function is dependent on another subordinate function which in turn is dependent on a primary function. For example a storage function (FC or iSCSI) can be dependent on a security function (encryption/decryption) for its operation and the security function is further dependent on the LAN function for its operation. Hence the operating system should perform driver sequencing in such a manner that the LAN driver is loaded first, the security driver is loaded next and then the FC driver is loaded last. Similarly, the reverse order should be followed while unloading the drivers. Similarly, other functional dependency operations on primary and subordinate functions should be performed appropriately not to affect the operation of other dependent functions.

Figure 2:
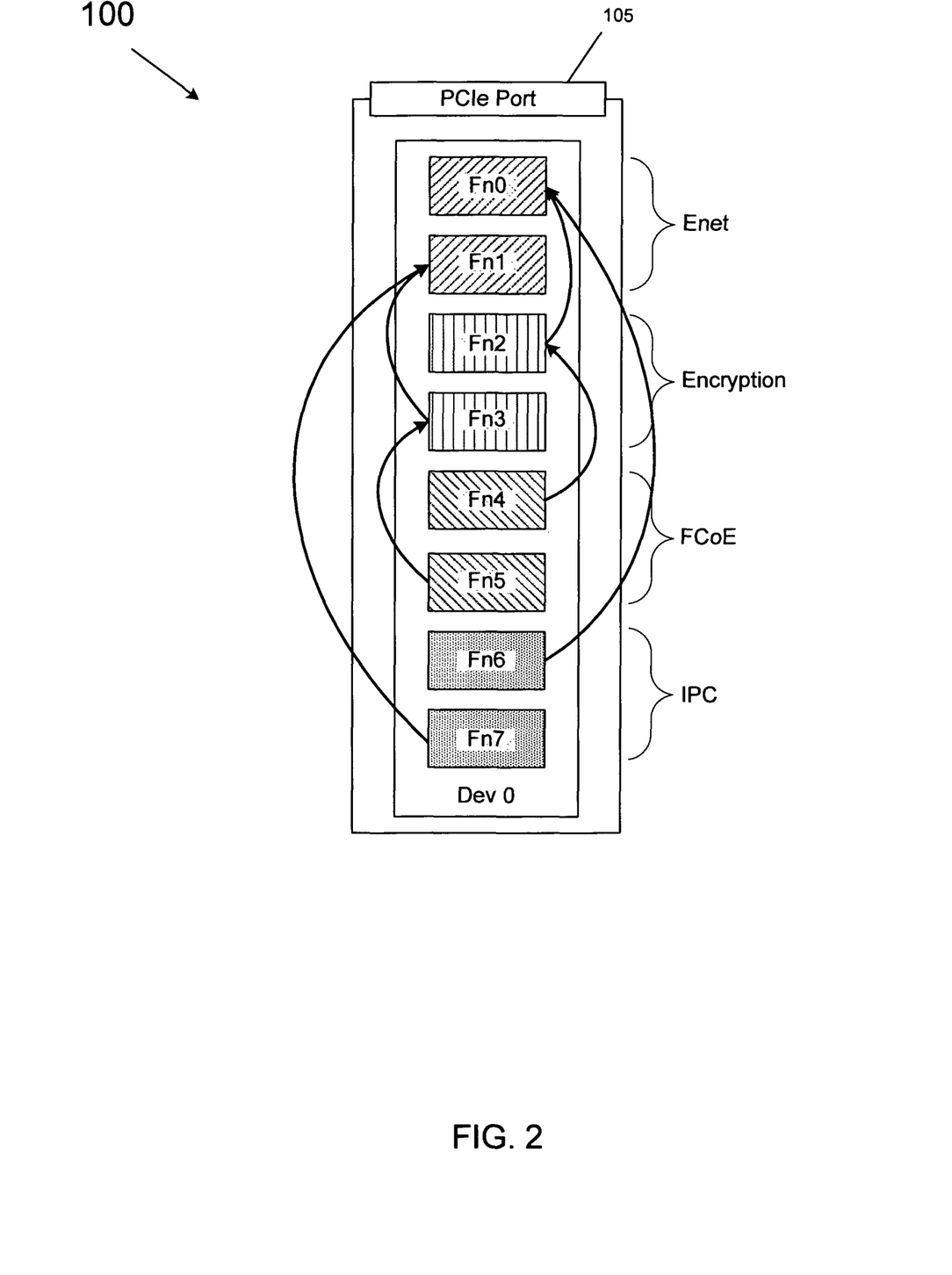
FIG. 2 is an illustration of a first method for defining a converged multifunction device in accordance with one embodiment of the present invention.

One method for defining a converged multi-function device is illustrated in FIG. 2. A multi-function device (Dev 0) 100 having a PCIe port 105 to couple the device to a given system, has two primary functions and multiple subordinate functions. As shown in FIG. 2, Fn0 and Fn1 are primary Ethernet functions. Fn2 and Fn3 are encryption functions that are dependent on the primary functions Fn0 and Fn1, respectively. Fn4 and Fn5 are storage functions (FCoE) that are dependent on the encryption functions Fn2 and Fn3 respectively, which in turn have cascaded dependency on the primary functions. Fn6 and Fn7 are RDMA functions used for IPC that are dependent on the primary Ethernet function.

Figure 3:
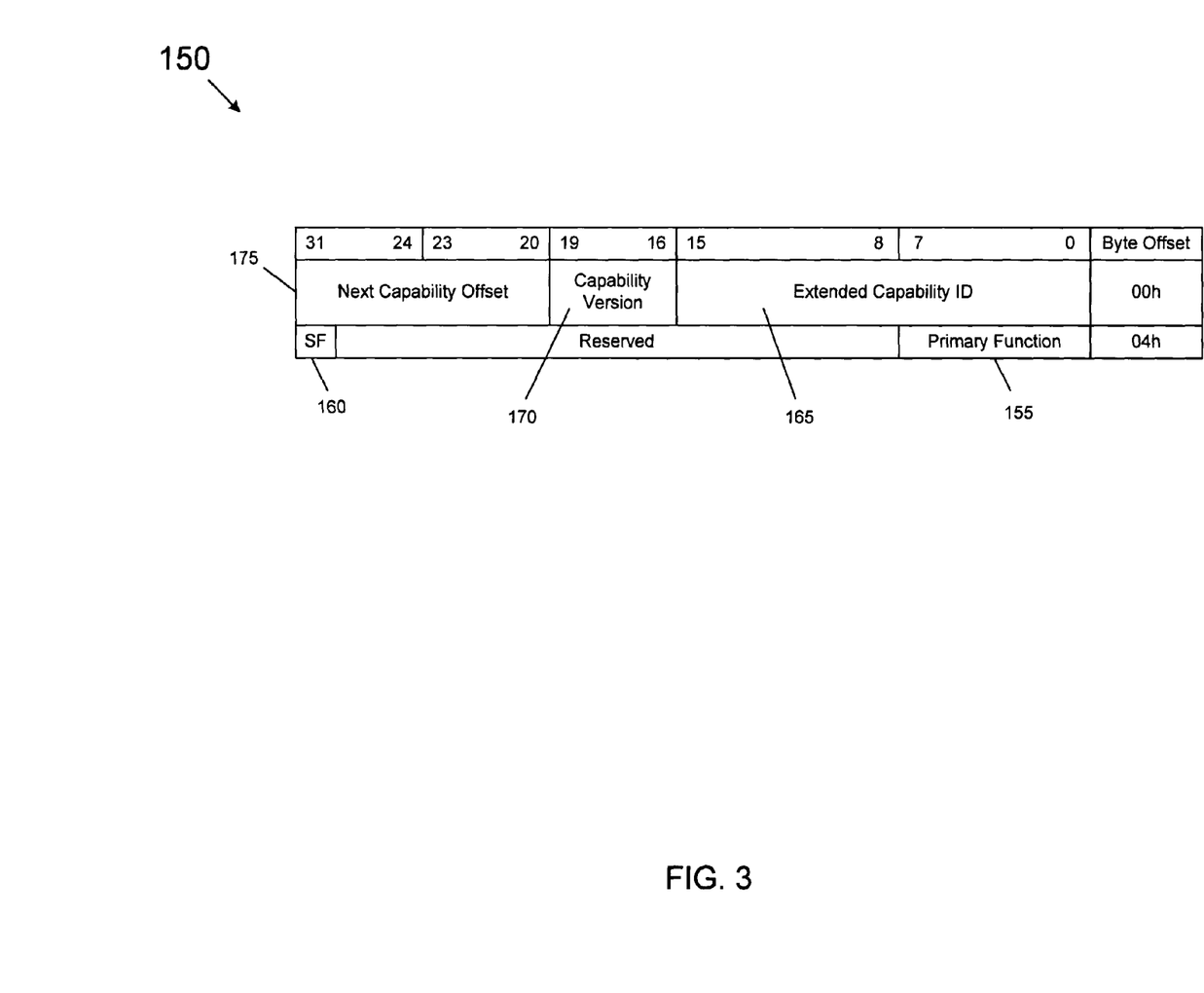
FIG. 3 is a block diagram of a capability data structure in accordance with one embodiment of the present invention.

In this method each function has the dependency indicated in a data structure 150 as shown in FIG. 3. In various embodiments, a data structure such as data structure 150 may be stored in, e.g., a PCI configuration space. Note that each PCI device function has a PCI configuration space that is defined by the PCI specification. Each PCI function in the device can implement these configuration registers, which are part of the device function. In some cases, certain configuration information stored in an external NVM can be loaded to configuration registers at power on. Upon power up, PCI configuration software (or firmware) will read the PCI configuration space to understand the capability of the device and configure the device appropriately.

Each function has an associated capability data structure that contains a primary function field 155 that provides the function number that must be sequenced ahead of this function. This method thus creates a reverse pointer structure so that the operating system, while performing a device scan, can build a dependency or driver sequencing tree as it reads the capability structure of each function. The operating system in turn can use this dependency tree for loading and unloading the drivers in the proper order or for other functional dependency control. Accordingly, the operating system or other software scans all the functions in an MFD to understand the dependency or sequencing requirements. The advantage of using a capability structure such as shown in FIG. 3 is that there is only a single (e.g., 8-bit) field needed (per function) to indicate the dependency.

As further shown in FIG. 3, a subordinate function indicator 160, also referred to as a SF bit, indicates that there is a subordinate function that depends on this function. This bit will be set for the primary function(s) and for other function(s) that have cascaded dependency. As further shown in FIG. 3, data structure 150 also includes an extended capability identifier field 165 to indicate that the device provides for the functional dependency information present in the data structure and that the device is capable of performing at least one function that is dependent upon another function. Still further, data structure 150 includes a capability version field 170, which may identify a version or other information regarding a capability of the device. Still further, data structure 150 includes a next capability offset field 175 that identifies an offset to a next capability, i.e., a capability other than the functional dependency information present in one or more data structures similar to that of data structure 150.

Figure 4:
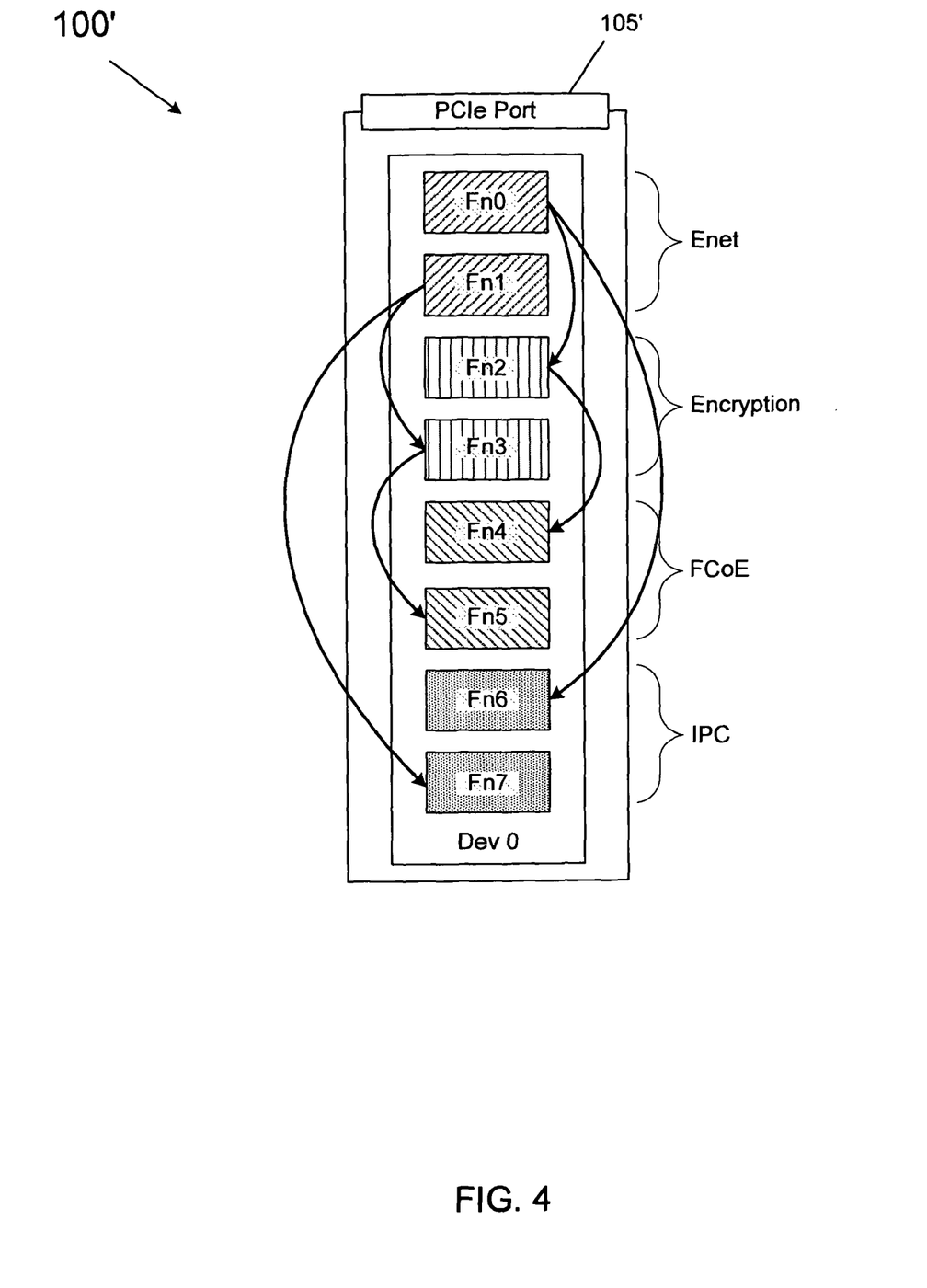
FIG. 4 is an illustration of a second method for defining a converged multifunction device in accordance with an embodiment of the present invention.

A second method for defining a converged multifunction device is illustrated in FIG. 4. The multi-function device (Dev 0) 100 has a PCIe port 105 to couple the device to a given system, and has two primary functions and multiple subordinate functions. Fn0 and Fn1 are primary Ethernet functions. Fn2 and Fn3 are encryption functions that are dependent on the primary functions Fn0 and Fn1 respectively. Fn4 and Fn5 are storage functions (FCOE) that are dependent on the encryption functions Fn2 and Fn3 respectively, which in turn have cascaded dependency on the primary functions. Fn6 and Fn7 are RDMA functions used for IPC that are dependent on primary Ethernet function.

Figure 5:
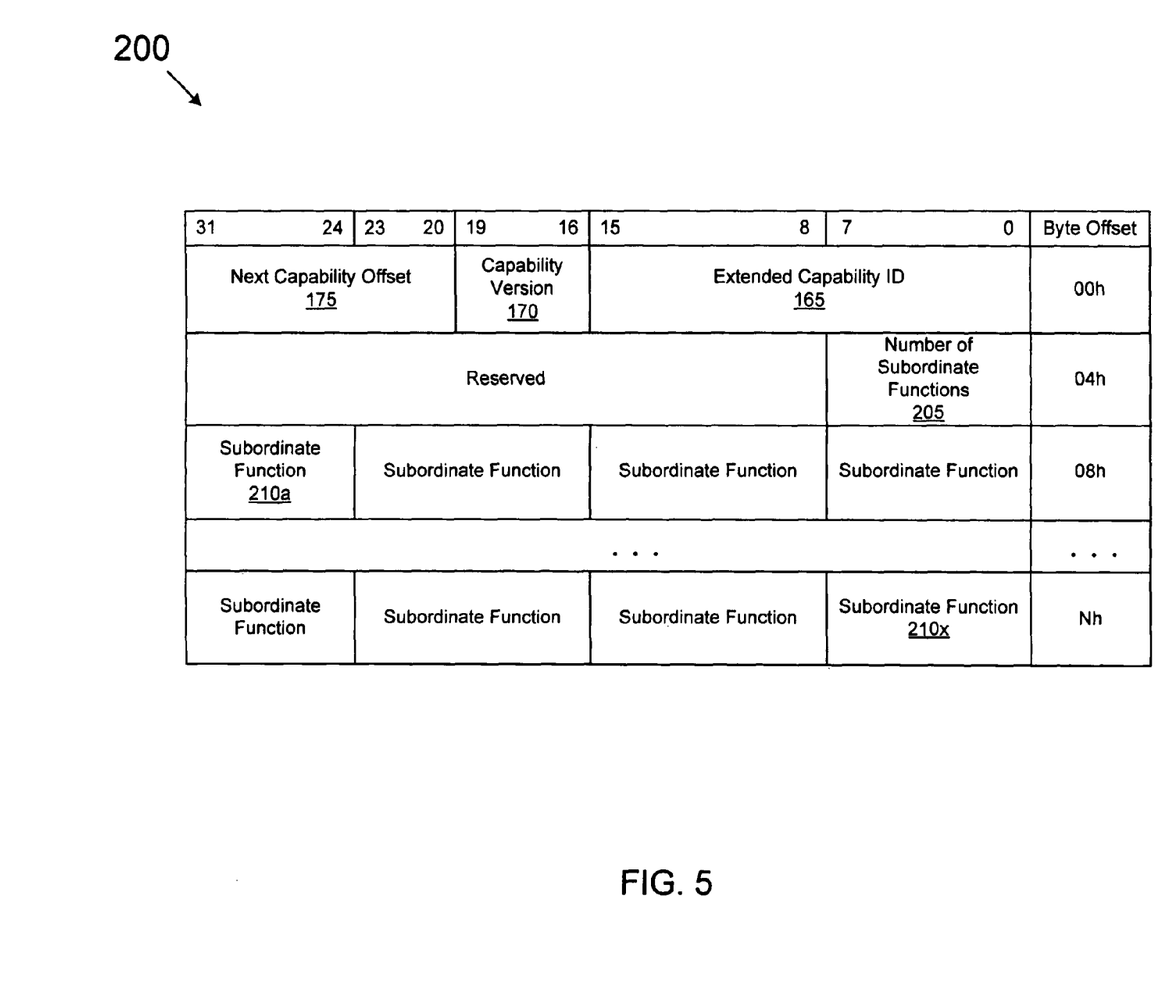
FIG. 5 is an illustration of a capability data structure in accordance with another embodiment of the present invention.

In this method each function has a forward dependency as indicated in the data structure as defined in FIG. 5. As shown in FIG. 5, the primary function(s) provide the list of all dependent functions and hence it is easy to identify the sequencing or dependency requirements when disabling a function. Each function has a capability data structure that provides the function numbers that are dependent on this function. Cascaded dependency is indirectly indicated by the primary function. Hence the software or operating system should scan all the functions to determine the cascaded dependency.

A capability structure in accordance with another embodiment of the present invention is illustrated in FIG. 5. As shown in FIG. 5, capability structure 200 has the same header fields, including extended capability identifier 165, capability version 170, and next capability offset field 175. In addition, capability structure 200 includes a number of subordinate functions field 205 (which may be 8-bits) to indicate the total number of subordinate functions that depend on a given function. The total number of subordinate functions field in the primary function will include all dependent functions including cascaded functions. If a cascaded function has further subordinate functions, this field will include the total number of subordinate functions that are dependent on that cascaded function only. This chain will continue for all subordinate functions. So a function that does not have any more dependent functions will have a number of subordinate functions field 205 as zero. In addition, a plurality of subordinate function fields $210_x$ (each of which may be 8-bits, in one embodiment) identifies the function number of the subordinate function(s), including cascaded functions. In another implementation field 210 can include only functions that are directly dependent on the primary function, and the subordinate function that has a cascaded dependency will include the functions that are dependent on it, such that it acts as a linked list. Since the software or firmware scans all the functions to determine the cascaded dependency it can build the complete dependency tree either way. In one embodiment, there can be up to a maximum of 256 subordinate functions that can be dependent on a function. An alternate implementation could have a 256-bit, bit mask to indicate the subordinate functions (instead of individual fields) to conserve configuration space. As described above, software or the operating system may scan all the functions in MFD to understand the cascading and sequencing requirements.

Figure 6:
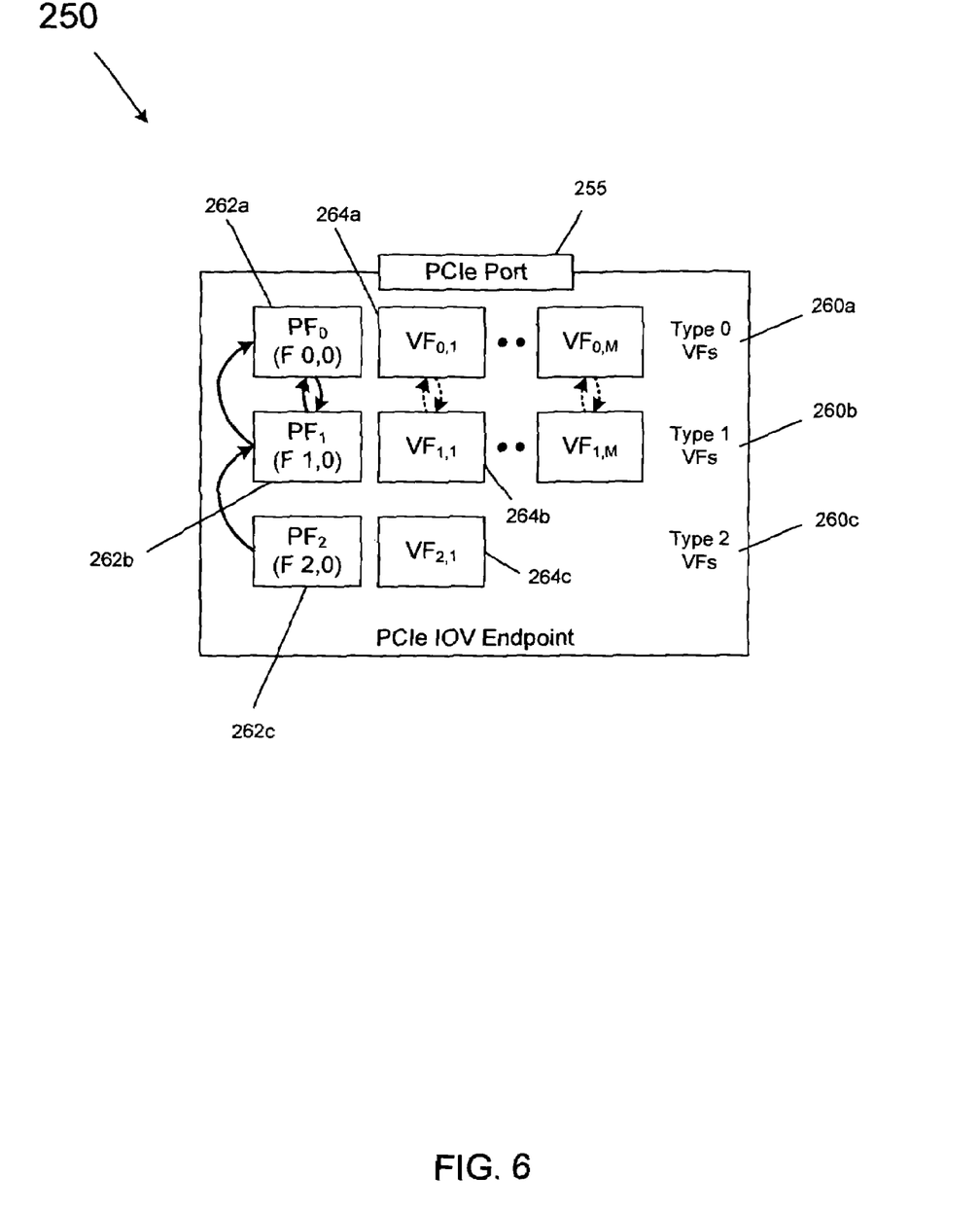
FIG. 6 is an illustration of a single root input/output (I/O) virtualization device (SR-IOV) converged controller that has functional dependency requirements in accordance with one embodiment of the present invention.

A converged controller can also be implemented as a single root input/output (I/O) virtualization device (SR-IOV). The driver sequencing requirement and methods to define function dependency described above are also applicable for an SR-IOV device. FIG. 6 provides an illustration of an SR-IOV converged controller 250 that has sequencing requirements.

The PCIe SR-IOV specification has a function dependency defined but is used for a different purpose. This SR-IOV function dependency is used to create function groups during virtual function (VF) assignment so the same number of VFs is assigned to all the physical functions (PF) in that groups. It is also used to indicate that the VFs in a group across the PFs are assigned together.

The functional dependency control and driver sequencing described herein is orthogonal to the SR-IOV function dependency and embodiments can provide for both to co-exist with one another. As described above, driver sequencing in accordance with an embodiment of the present invention can indicate a primary function to be active before a subordinate function is to be activated. The sequencing issues described above also apply to the SR-IOV physical functions of endpoint 250 that includes a port 255 to be coupled to a link as illustrated in FIG. 6. The virtual functions (VFs) $264_x$ of each type $260_a$-$260_c$ (generically 264) implicitly assume dependency from the physical functions (PFs) $262_x$ (generically 262) of the same type and hence the VFs 264 will be sequenced after the primary PFs 262 are operational. In FIG. 6, PF1 $264_b$ is dependent on PF0 $264_a$; hence all the VFs in PF1 $262_b$ will have implicit dependency on PF0 $262_a$. Hence the driver sequencing should be performed in such a way that PF0 $262_a$ should be operational before any of the VFs in PF1 $264_b$ are serviced. The VFs within a dependency group can be serviced in any order and also the number of VFs in a subordinate function need not be same as that of the primary function. The dependency between physical and virtual functions can be identified using capability data structures such as that described above with regard to FIGS. 3 and 5, for example.

Embodiments thus enable convergence of controllers such as Fibre Channel HBAs and LAN NICs to be integrated into the same PCI device. These controllers can be implemented as multi-function PCI devices. In this way, the multi-function converged controllers can adapt to the existing software architecture for LAN and storage applications and can retain the existing management framework for LAN and SAN devices. Similarly, the converged controller can have other functions such as an RDMA function for IPC traffic or other such functions.

To this end, a converged PCI multi-function device can define its dependency and driver sequencing or other function dependency control requirements. Using a data capability structure in accordance with an embodiment of the present invention, an operating system or other software can be made aware of a MFD used for implementing converged controllers. In this way, the OS can properly initialize and manage a multi-function converged network controller.

Figure 7:
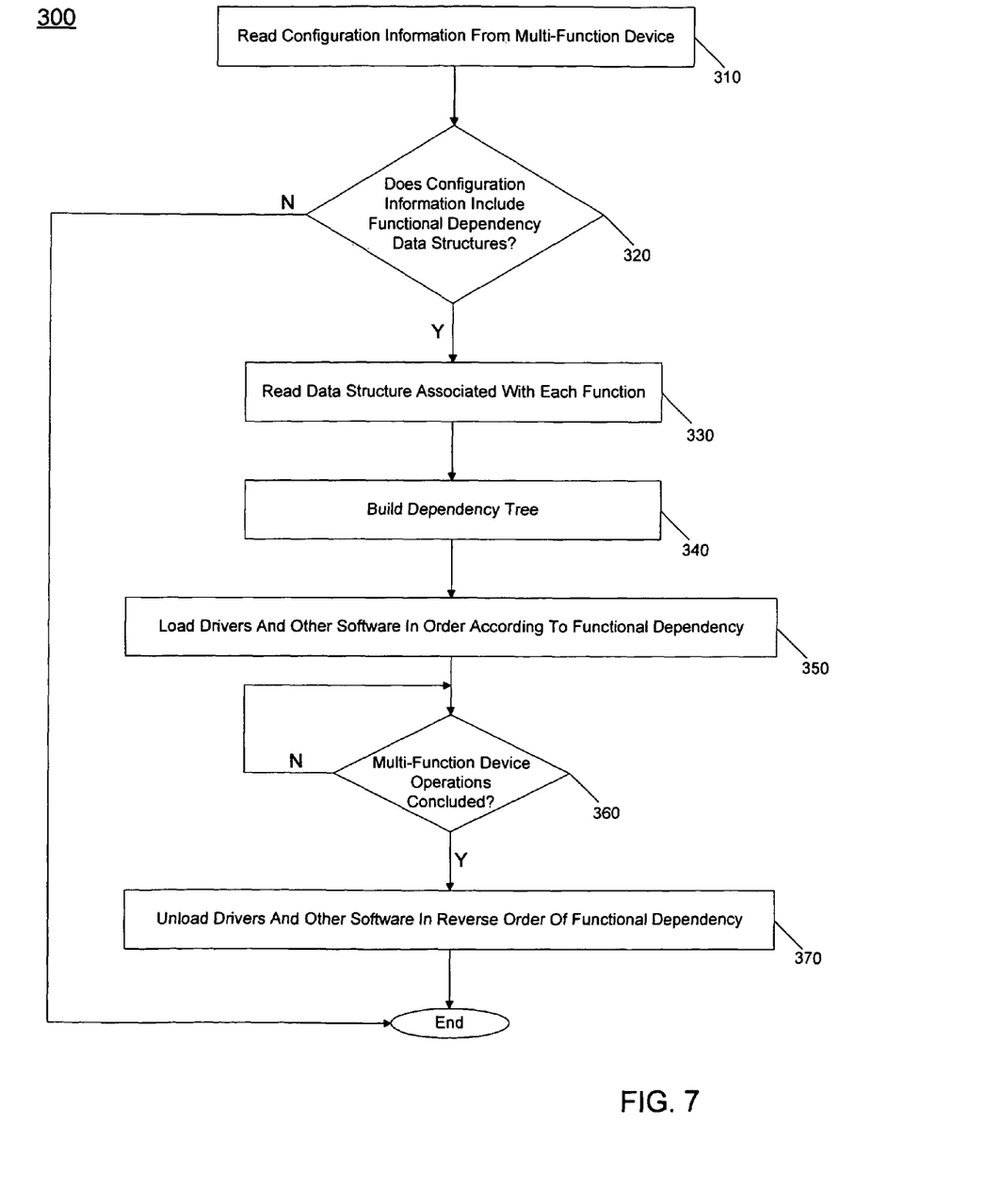
FIG. 7 is a flow diagram of a method in accordance with an embodiment of the present invention.

Referring now to FIG. 7, shown is a flow diagram of a method in accordance with an embodiment of the present invention. As shown in FIG. 7, method 300 may be used by an OS or other system software or firmware to obtain configuration information from a multi-function controller in accordance with an embodiment of the present invention and control loading and unloading of various software for implementing dependent functions to be performed by the MFD. As shown in FIG. 7, method 300 may begin by reading configuration information from the MFD (block 310). In a PCI implementation, such configuration information may be obtained using PCI configuration cycles to thus receive various information present in the MFD regarding its capabilities. This information may include capability data structures such as described above.

Referring still to FIG. 7, next it may be determined whether the configuration information includes one or more functional dependency data structures (diamond 320). If not, method 300 may conclude, as the MFD does not have support for such functional dependency control. If instead such data structures are present, control passes to block 330. At block 330, a data structure associated with each such function that can be performed in the MFD is read. In various implementations, these data structures may be similar to those described above with regard to FIGS. 3 and 5. In this way, the OS may build a dependency tree based on these data structures (block 340). In some embodiments, the dependency tree may be a forward-based pointer structure, although in other embodiments the dependency tree may be a reverse-based pointer structure, as described above.

Next, at block 350 various drivers and/or other software may be loaded by the OS in order according to the functional dependency indicated by the data structure information. For example, in an implementation with a LAN function and a dependent SAN function, the software associated with the LAN function is first loaded such that the LAN functionality is enabled prior to loading of the software for the SAN functionality. In this way, when a SAN function is executed, complete software support is present.

Referring still to FIG. 7, at diamond 360 it may be determined whether the MFD operations have concluded. If not, the various operations performed by the MFD may continue. Note that other operations during runtime may be performed according to functional dependency. For example, a reset operation of a function, or modification of operational modes of common resources such as a switch, MAC, or PHY, may occur. Otherwise, at the conclusion of MFD operations control passes to block 370, where the drivers and/or other software may be unloaded in reverse order to their loading. In this way, the dependent software may first be unloaded before the primary software is unloaded. While shown with this particular implementation in the embodiment of FIG. 7, the scope of the present invention is not limited in this regard.

Figure 8:
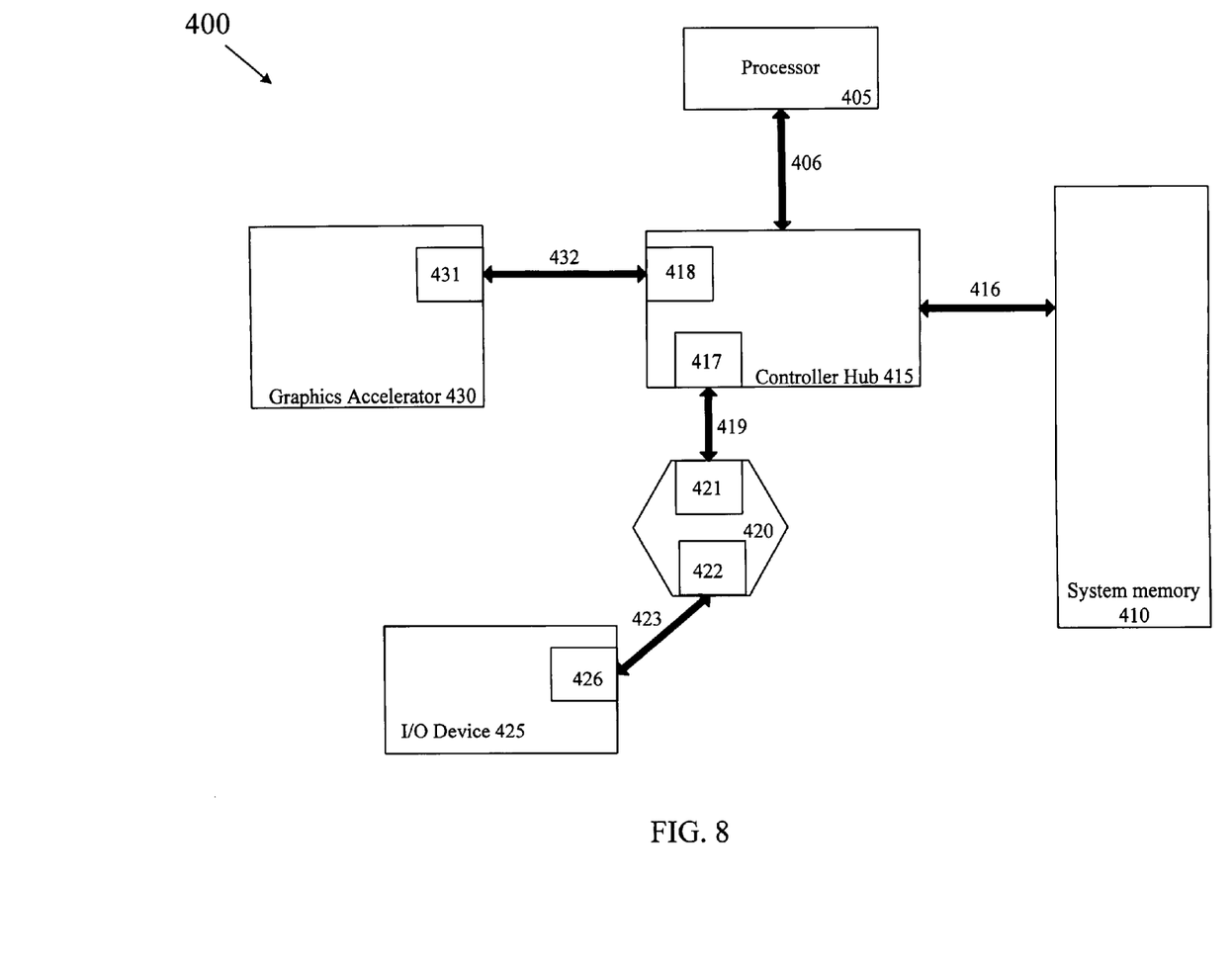
FIG. 8 is a block diagram of a system in accordance with one embodiment of the present invention.

Embodiments can be implemented in many different system types. Referring to FIG. 8, a block diagram of a system in accordance with one embodiment of the present invention including devices coupled to a controller hub via a serial link is illustrated. System 400 includes a processor 405 and a system memory 410 coupled to a controller hub 415. Processor 405 includes any processing element, such as a microprocessor, a host processor, an embedded processor, a co-processor, or other processor to execute instructions. Processor 405 is coupled to controller hub 415 through a front-side bus (FSB) 106. In one embodiment, FSB 406 is a serial point-to-point (PtP) interconnect as described below.

System memory 410 includes any memory device, such as random access memory (RAM), non-volatile (NV) memory, or other memory accessible by devices in system 400. System memory 410 is coupled to controller hub 415 through a memory interface 416.

In one embodiment, controller hub 415 is a root hub or root controller in a PCIe interconnection hierarchy, and may be a SR-IOV controller, in one embodiment. Examples of controller hub 415 include a chipset, a memory controller hub (MCH), a northbridge, an input/output controller hub (ICH) a southbridge, and a root controller/hub. Here, controller hub 415 is coupled to a switch/bridge 420 through a serial link 419. Input/output modules 417 and 421, which may also be referred to as interfaces/ports 417 and 421, include/implement a layered protocol stack to provide communication between controller hub 415 and switch 420. In one embodiment, multiple devices are capable of being coupled to switch 420. Embodiments may also apply where a processor and chipset are integrated into the same package. Further, this technique does not require a new revision of PCIe protocol, and can be implemented by PCIe 2.0, 1.1 compatible devices, among others. Thus embodiments can be used anywhere a PCIe interconnect is used for communication.

Switch 420 routes packets/messages from a device 425 upstream, i.e., up a hierarchy towards controller hub 415 and downstream, i.e., down a hierarchy away from controller hub 415 to device 425. IO modules 422 and 426 implement a layered protocol stack to communicate between switch 420 and device 425. Device 425 may be a MFD in accordance with an embodiment of the present invention. As examples of converged functions, IO device 425 may include hardware to perform functionality for LAN, SAN, IPC among others, and may provide coupling to a network such as a converged Ethernet fabric.

A graphics accelerator 430 is also coupled to controller hub 415 through serial link 432. In one embodiment, graphics accelerator 430 is coupled to an MCH, which is coupled to an ICH. Switch 420, and accordingly IO device 425, is then coupled to the ICH. IO modules 431 and 418 are also to implement a layered protocol stack to communicate between graphics accelerator 430 and controller hub 415.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a multi-function controller including hardware to perform a first function and a second function, wherein the second function is dependent on the first function, the multi-function controller including a first storage to store a plurality of data structures each associated with a function to be performed by the hardware and including a first indicator to indicate that the associated function is dependent on another function and a second indicator to identify the function on which the associated function is dependent, wherein the plurality of data structures form a pointer structure to enable an operating system (OS) to perform driver sequencing based on the pointer structure.

2. The apparatus of claim 1, wherein the second indicator of at least one of the data structures is to identify the first function.

3. The apparatus of claim 2, wherein the second indicator of another of the data structures is to identify the second function that in turn is dependent on the first function.

4. The apparatus of claim 3, wherein the plurality of data structures form a reverse pointer structure to indicate functional dependency of the multi-function controller.

5. The apparatus of claim 4, wherein the OS is to read the plurality of data structures, and based on the reverse pointer structure, load a first driver for the first function before loading a second driver for the second function.

6. The apparatus of claim 1, wherein each of the plurality of data structures are of an equal length.

7. The apparatus of claim 1, wherein the first storage includes a first data structure associated with a primary function, the first data structure including a first indicator to store an indication of a number of subordinate functions to be dependent on the primary function, and a plurality of second indicators each to identify one of the subordinate functions.

8. The apparatus of claim 7, wherein the first storage includes a second data structure associated with a first subordinate function, the second data structure including a first indicator to store an indication of a number of second subordinate functions to be dependent on the first subordinate function and a plurality of second indicators each to identify one of the second subordinate functions, wherein the first subordinate function is to be dependent on the primary function.

9. The apparatus of claim 1, wherein the apparatus comprises a single root input/output virtualization (SR-IOV) device including a plurality of physical functions each having at least one virtual function dependent thereon.

10. The apparatus of claim 9, wherein a first one of the plurality of data structures is to identify that a second physical function is dependent on a first physical function, such that a virtual function dependent on the second physical function is in turn dependent on the first physical function.

11. A method comprising:
    reading configuration information from a multi-function device (MFD) that can perform a plurality of functions;
    building a dependency tree of a functional dependency of at least some of the plurality of functions based on data structures of the configuration information, the data structures including a dependency indicator to indicate that the MFD is capable of performing at least one function dependent upon another function, wherein the data structures form a pointer structure for use by an operating system to perform sequencing of software; and
    loading the software associated with the plurality of functions in order based at least in part on the functional dependency indicated by the data structures according to the software sequencing.

12. The method of claim 11, further comprising determining whether MFD operations have concluded.

13. The method of claim 12, further comprising unloading the software in reverse order to the loading of MFD operations.

14. The method of claim 12, wherein the MFD operations include communicating storage area network (SAN) data from the MFD to a converged link coupled to the MFD using a local area network (LAN) function on which the SAN function is dependent.

15. The method of claim 14, further comprising loading LAN software for the LAN function before loading SAN software for the SAN function.

16. The method of claim 11, further comprising reading the configuration information and building the dependency tree using the operating system configured to read the data structures.

17. A system comprising:
    a processor to execute instructions;
    a dynamic random access memory (DRAM) coupled to the processor; and
    a multi-function controller coupled between the processor and a converged link that is to carry communications of a local area network (LAN) and of a storage area network (SAN), the multi-function controller including hardware to perform a SAN function and a LAN function, wherein the SAN function is dependent on the LAN function, the multi-function controller including a storage to store a data structure including a dependency identifier so that an operating system is to load first software associated with the LAN function prior to second software associated with the SAN function, the data structure of a plurality of data structures each associated with a function to be performed by the hardware and including a first indicator to indicate that the associated function is dependent on another function and a second indicator to identify the function on which the associated function is dependent, wherein the plurality of data structures form a pointer structure.

18. The system of claim 17, wherein the second indicator of at least one of the data structures is to identify the first function and the second indicator of another of the data structures is to identify the second function that in turn is dependent on the first function.

* * * * *